United States Patent [19]

Sears

[11] Patent Number: 5,785,574
[45] Date of Patent: Jul. 28, 1998

[54] ADJUSTABLE DIAPHRAGM GAME CALLS

[76] Inventor: Joseph R. Sears, P.O. Box 154, Spencer, N.Y. 14883

[21] Appl. No.: 602,304

[22] Filed: Feb. 16, 1996

[51] Int. Cl.$^6$ .................................................. A63H 5/00
[52] U.S. Cl. .................................... 446/208; 446/397
[58] Field of Search ........................... 446/206, 207, 446/208, 209, 188, 176, 397, 203, 202; 43/1, 2

[56] References Cited

U.S. PATENT DOCUMENTS

| | | | |
|---|---|---|---|
| 813,853 | 2/1906 | Brunner | 446/208 |
| 2,583,400 | 1/1952 | Wade | 446/208 X |
| 2,928,209 | 3/1960 | Johnson | 446/207 |
| 3,579,903 | 5/1971 | Stewart | 446/208 |
| 4,143,485 | 3/1979 | Stewart | 446/207 |
| 4,483,097 | 11/1984 | Piper . | |
| 4,490,451 | 12/1984 | Leady | 446/207 X |
| 4,897,067 | 1/1990 | Piper . | |
| 4,927,399 | 5/1990 | Mueller . | |
| 4,960,400 | 10/1990 | Cooper . | |
| 5,061,220 | 10/1991 | Cooper . | |
| 5,222,903 | 6/1993 | Parrott et al. | 446/207 |
| 5,234,369 | 8/1993 | Forbes et al. . | |

*Primary Examiner*—Robert A. Hafer
*Assistant Examiner*—D. Neal Muir
*Attorney, Agent, or Firm*—Brown, Pinnisi & Michaels, P.C.

[57] ABSTRACT

A device for adjusting the pitch and quality of the sound produced by a diaphragm-type game call. Two embodiments are presented, which may be built by the manufacturer into a conventional call or clipped onto a pre-existing call by the hunter. The invention comprises a tuning bar which extends across the width of the diaphragm. The tuning bar may be slid along the length of the diaphragm, from the vibrating edge inward toward the fixed supported end. In the preferred embodiment, the tuning bar has a tab or "step" which extends downward toward the diaphragm, acting as a fret or stop and modifying the air flow over the diaphragm, allowing greater variations in sound.

10 Claims, 1 Drawing Sheet

ADJUSTABLE DIAPHRAGM GAME CALLS

FIELD OF THE INVENTION

The invention pertains to the field of devices for mimicking animal sounds. More particularly, the invention pertains to diaphragm-type calls, especially those for turkey and the like.

BACKGROUND OF THE INVENTION

Diaphragm-type turkey calls have been in use for many years. A hunter causes the call to emit sounds by placing the call into his mouth, either against the roof of the mouth or, in so-called "lip calls", between his upper lips and teeth, and blowing across the call.

Typically, these calls comprise a pair of generally rectangular or horseshoe-shaped frame elements supporting one or more strips of pre-tensioned diaphragm material such as latex, rubber, or the like. The diaphragm is held by the frame along its edges and at the rear, and is free to vibrate and produce sound at its outward end.

The frame and diaphragm elements are surrounded by a tab of paper or cloth which allows the call to be placed against the roof of the mouth.

Typically, a hunter will want to be able to make a number of different calls, so as to be able to attract the maximum number of birds or other game such as elk. For example, the inventor of the present invention currently markets sixteen different kinds of single, double and triple diaphragm calls, some with contouring or tapering or slits in one or more of the diaphragm, and with differing offsets, tensions and materials. This selection of devices permits the hunter to variously produce clear or raspy calls, light or loud calls, or calls of varying pitch. The disadvantage is that the hunter has to carry many devices to produce the variety of calls.

The diaphragm call field is a crowded one. Examples of several prior patents showing variations on diaphragm calls to produce different sounds are Piper, U.S. Pat. Nos. 4,483,097 and 4,897,067; Mueller, U.S. Pat. No. 4,927,399; or Cooper, U.S. Pat. No. 4,960,400. Each of these calls is specialized to produce a single range of sounds, variable only by the control of the hunter's breath and mouth.

Another Cooper patent, U.S. Pat. No. 5,061,220, allows some variability of the sound. Cooper's invention expects the hunter to vary the tension of the diaphragm by pressing his tongue against part of the diaphragm which acts as a fret of sorts. This requires mouth control by the user, and is hard to use.

SUMMARY OF THE INVENTION

The invention presents a means for adjusting the pitch and quality of the sound produced by a diaphragm-type game call. Two embodiments are presented, which may be built by the manufacturer into a conventional call or clipped onto a pre-existing call by the hunter.

The invention comprises a tuning bar which extends across the width of the diaphragm. The tuning bar may be slid along the length of the diaphragm, from the vibrating edge inward toward the fixed supported end. In the preferred embodiment, the tuning bar has a tab or "step" which extends downward toward the diaphragm, acting as a fret or stop and modifying the air flow over the diaphragm, allowing greater variations in sound.

DESCRIPTION OF THE PREFERRED EMBODIMENT

Figure 1:
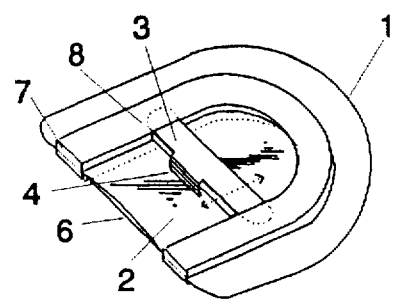
FIG. 1 shows the invention in its embodiment built-in to a diaphragm call.

FIG. 1 shows a diaphragm-type turkey call (1), with the invention incorporated into it. The call is shown as one with two stacked diaphragms (2), but it will be understood that the invention is useful with any type of diaphragm call, regardless of the number or arrangement of diaphragm(s).

A tuning bar (3) is placed on top of the frame (7) holding the diaphragm (2), underneath the covering (8), so that it is free to slide toward and away from the free edge (6) of the diaphragm (2). The tuning bar may be made of thin metal, or plastic or other material. The thickness of the frame (7) keeps the tuning bar (3) from actually touching the diaphragm, thus it is suspended a small distance above it.

The tuning bar (3) acts as a fret or stop, modifying the vibration of the diaphragm (2). As the tuning bar is slid toward the free end (6) of the diaphragm, the sound becomes higher in pitch. As the tuning bar is slid away from the free end, the sound becomes lower in pitch.

Figure 2:
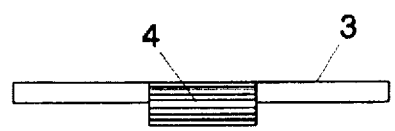
FIG. 2 shows a front view of the tuning bar, showing the step.
Figure 3:
FIG. 3 shows a side view of the tuning bar.
Figure 5:
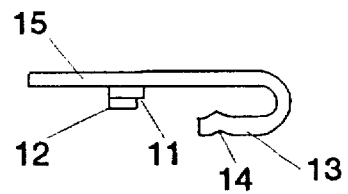
FIG. 5 shows a side view of the clip embodiment of the invention.

In the preferred embodiment, extending downward from the tuning bar (3) is a tab or step (4), which serves to further modify the sound. The step can be formed, as shown in FIGS. 1-3, as a bent-over part of the tuning bar edge, or may be a thickened portion of the tuning bar body as shown in FIG. 5. The step (4) extends closer to the diaphragm than the tuning bar. The step may clear the surface of the diaphragm by a small distance, or it may actually touch the diaphragm when the diaphragm is at rest.

The step modifies the airflow over the diaphragm, and, in certain locations with some diaphragms, may touch the vibrating diaphragm to cause a "raspy" sound which is desirable when attempting to imitate older birds, especially hen turkeys, or the distress calls of calf elk.

Figure 4:
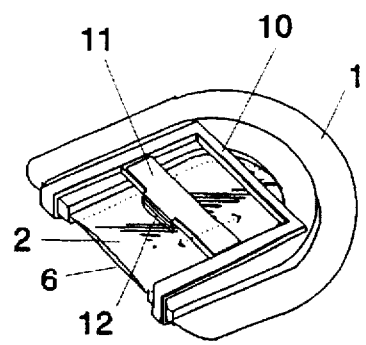
FIG. 4 shows the clip-on embodiment of the invention, suitable for use with an existing game call, in use on a diaphragm call.

The invention can also be made in a "clip-on" embodiment (FIGS. 4 and 5), which allows the tuning bar (11) to be attached to an existing diaphragm call (1). A clip (10), preferably formed of a resilient material such as a light springy metal or injection molded plastic, clips over the frame of the diaphragm call, such that it does not obstruct the diaphragm (2). The tuning bar (11) is slidably mounted to or held under the clip (10), so that it can be slid along the clip towards and away from the free edge (6) of the diaphragm (2).

The clip has side rail portions (15) along which the tuning bar (11) slides, and a clamp portion (13) which holds tight to the frame of the call. A bump (14) may be formed into the clamp (13), in order to increase the clamping ability of the clip.

As in the built-in embodiment, the tuning bar (11) preferably has a step (12) to further modify the sound.

This embodiment of the invention would permit a hunter with a collection of calls to purchase the invention and clip it onto one of his calls, expanding the range of his calls without necessitating carrying additional calls. In fact, with the use of the tuning bar of the invention in this embodiment, existing calls can be caused to make sounds which were not available previously.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A variable-sound diaphragm game call comprising:
   a) a frame;
   b) at least one diaphragm having a plurality of fixed edges mounted to the frame, and having only one edge free to vibrate in response to airflow over the diaphragm;
   c) a covering over a top of the frame having two parallel lengthwise slots formed between the covering and two opposing sides of the frame; and
   d) a tuning bar slidably mounted to the frame extending widthwise between the two parallel slots adjacent to the diaphragm, such that the tuning bar can be slid toward or away from the free edge of the diaphragm, modifying the sound produced by the vibrating diaphragm.

2. The variable-sound diaphragm game call of claim 1 further comprising a step extending from the tuning bar toward the diaphragm.

3. The variable-sound diaphragm game call of claim 2, in which the step is a distance from the diaphragm when the diaphragm is at rest.

4. The variable-sound diaphragm game call of claim 2 in which the step is formed from a bent-over edge of the tuning bar.

5. The variable-sound diaphragm game call of claim 2 in which the step is affixed to the tuning bar on the side of the tuning bar facing the diaphragm.

6. A variable-sound tuning attachment for diaphragm game calls of the kind having a frame and at least one diaphragm having a plurality of fixed edges mounted to the frame, and having at least one edge free to vibrate in response to airflow over the diaphragm, the tuning attachment comprising:
   a) a clip dimensioned to fit over the frame of the game call without infringing upon the diaphragm, having side rails fitting over the frame, and a clamp portion holding to the frame; and
   b) a tuning bar slidably mounted to the side rails of the clip adjacent to the diaphragm, such that the tuning bar can be slid toward and away from the free edge of the diaphragm, modifying the sound produced by the vibrating diaphragm.

7. The variable-sound tuning attachment of claim 6 further comprising a step extending from the tuning bar toward the diaphragm.

8. The variable-sound tuning attachment of claim 7, in which the step is a distance from the diaphragm when the diaphragm is at rest.

9. The variable-sound tuning attachment of claim 7 in which the step is formed from a bent-over edge of the tuning bar.

10. The variable-sound tuning attachment of claim 7 in which the step is affixed to the tuning bar on the side of the tuning bar facing the diaphragm.

* * * * *